Oct. 23, 1956  F. P. LACKINGER  2,767,736
FLUID PICKUP
Filed March 25, 1953  2 Sheets-Sheet 1
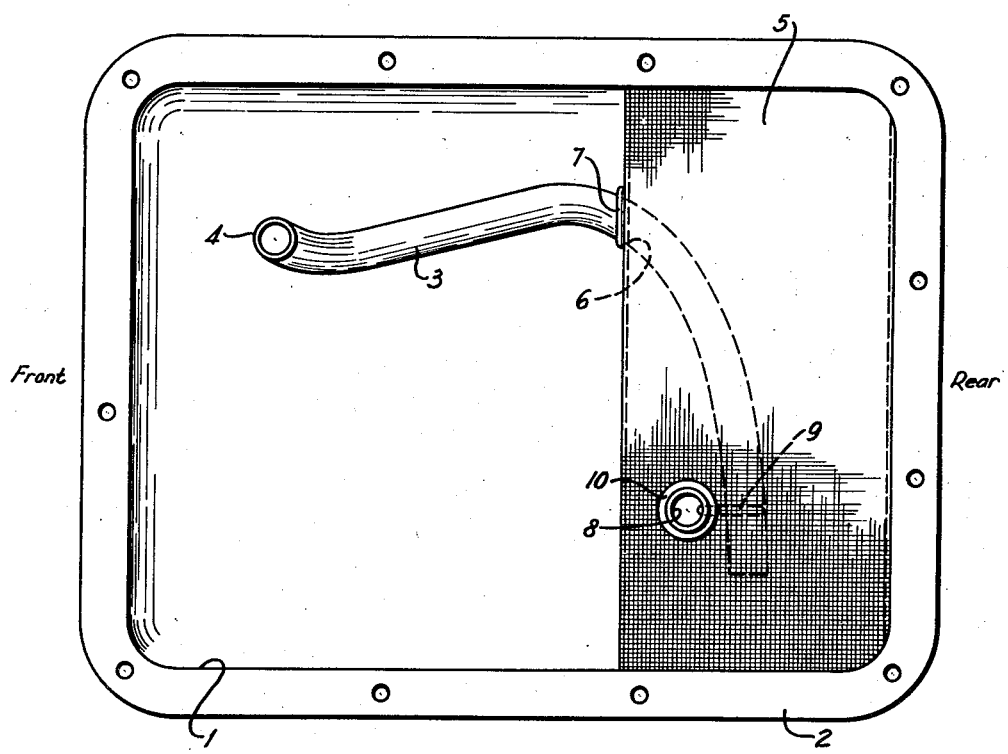
Fig. 1
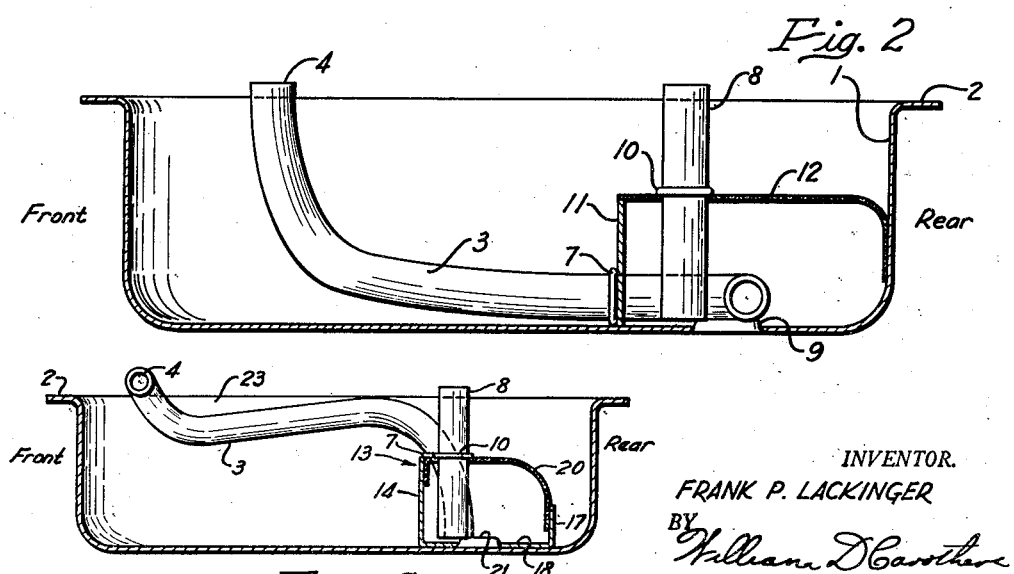
Fig. 2
Fig. 6
INVENTOR.
FRANK P. LACKINGER
BY William D Carothers
HIS ATTORNEY Oct. 23, 1956   F. P. LACKINGER   2,767,736
FLUID PICKUP Filed March 25, 1953   2 Sheets-Sheet 2

INVENTOR.
FRANK P. LACKINGER
BY
William D. Carothers
HIS ATTORNEY

United States Patent Office 2,767,736
Patented Oct. 23, 1956

2,767,736

FLUID PICKUP

Frank P. Lackinger, McKees Rocks, Pa.

Application March 25, 1953, Serial No. 344,590

2 Claims. (Cl. 137—574)

This invention relates generally to a fluid pickup, and more particularly to a fluid pickup for a servo pump of an automatic transmission for a vehicle.

Some automatic transmissions are provided with servo pumps which supply fluid to the servomotors of the mechanism for automatically changing the speed of the vehicles such as automobiles, trucks, or buses. The operating fluid is usually an oil and is contained within the reservoir or housing of the transmission. These transmissions have one or more servo pumps which draw the liquid from the reservoir and apply it under pressure to the servomotor to automatically increase or decrease the speed of the vehicle in accordance with the operating demand.

In a planetary transmission, the servo pumps supply liquid under pressure to the servomotors that apply bands to effect or operate other modes of control in changing speeds of the vehicle. The liquid contained within the housing swishes around due to inertia. Just when the servo pump requires a steady supply of the actuating liquid to maintain the controls, inertia moves the liquid away from the inlets of the servo pump. This happens when the vehicle turns, stops, starts, or suddenly performs some other motion causing the inertia of the liquid to induce a change in the relative movement taking it from the servo pump pickup line. The pump then sucks air. This influx of air, not only tends to aerate the liquid, but it also causes the servomotor to lose its proper speed sequence in the automatic speed changing device resulting in the misapplication of power and the loss of speed of the vehicle. This also induces increased wear and tear on the mechanism, not only due to the influx of air in the servo pumps, but also in the speed-changing servomotors.

When starting up, the servo pumps must be continuously supplied with liquid or they will attempt to skip intermediate speed changes during acceleration resulting in effecting a selected speed too high for the attained acceleration. This results in a wear in the transmission, and an immediate jerk with the loss of speed of the vehicle which induces wear.

Air sucked into the servo pump causes it to speed up without effecting a pressure and when the liquid swishes back and covers the servo pump inlet, the sudden influx of the oil jerks the automatic control to a lower speed not in synchronism with the actual speed of the vehicle, or the motor.

The principal object of this invention is to provide means whereby the servo pump inlets are always covered with the actuating medium. Regardless of the sudden change, the servo pump inlet may be positioned within the reservoir or housing of the automatic transmission so that it is at all times supplied with liquid and at no time will it receive an influx of air.

In order to reduce the inertia factor on the operating liquid within the automatic transmission, one can place the servo pump inlets at the rear and the bottom of the housing. The only time that the operating liquid leaves this point is when one sets their foot on the brake and causes the vehicle to suddenly stop, in which case the liquid is not needed, and a forward surge of the liquid, when the car suddenly stopped, will have no effect on the driving operation of the automatic gear-shifting device. Thus, the mere location of the servo pump inlets to the rear and the bottom of the housing is sufficient to prevent 80 percent of the failures created by the influx of air into the servo pump at the wrong time.

The second step is to prevent the forward surge of the liquid pool which is attained by the provision of a baffle across the pan and secured to the bottom of the pan. The servo pump inlet that is in the pan is close to the bottom and rear. Such a baffle may be made integral with the side walls and bottom of the pan and should be enclosed with a screen to eliminate the recirculation of foreign matter such as wearing material from the bands or other parts of the speed-changing device.

The further improvement of the inlet of the servo pumps may be provided with a box which has a relatively high front and side walls and a relatively low back wall which is covered with a wire screening for admitting the liquid to the inlets that are retained within the box. This box may be assembled on the inlet pipes to the servomotors before the pan of the housing is replaced. By employing an independent box of this character, one eliminates entirely the factor of inertia on the liquid, and the two servo pump inlets, which are within the box, maintain the box in position, and the placing of the pan on the underside of the housing not only encloses the box but also provides a simple manner for the application of the screened box.

By employing the inlet pipes at the rear of the housing or by providing a single baffle wall or a box enclosure with a screen inlet, one is enabled to supply the servo pumps with liquid at any time it is needed, and air is never pumped in through the inlets to starve the pumps and thereby induce wear. The only time that the liquid is apt to leave the rear of the chamber is when the vehicle is stopped or is proceeding down the hill at which time the effect in changing the gears does not produce a starved inlet to one of the pumps. However, by the use of the baffle or the box, which retains the liquid at all times around the inlet vicinity, no air can be introduced into the system to aerate the liquid and induce wear in the device.

Other objects and advantages appear hereinafter in the following description and claims.

In the accompanying drawings, a practical embodiment illustrating the principles of this invention are shown wherein:

Fig. 1 is a plan view showing both inlets directed to the rear of the housing.

Fig. 2 is a vertical section illustrating both inlets directed to the rear of the housing and positioned behind a baffle wall.

Figure 3:
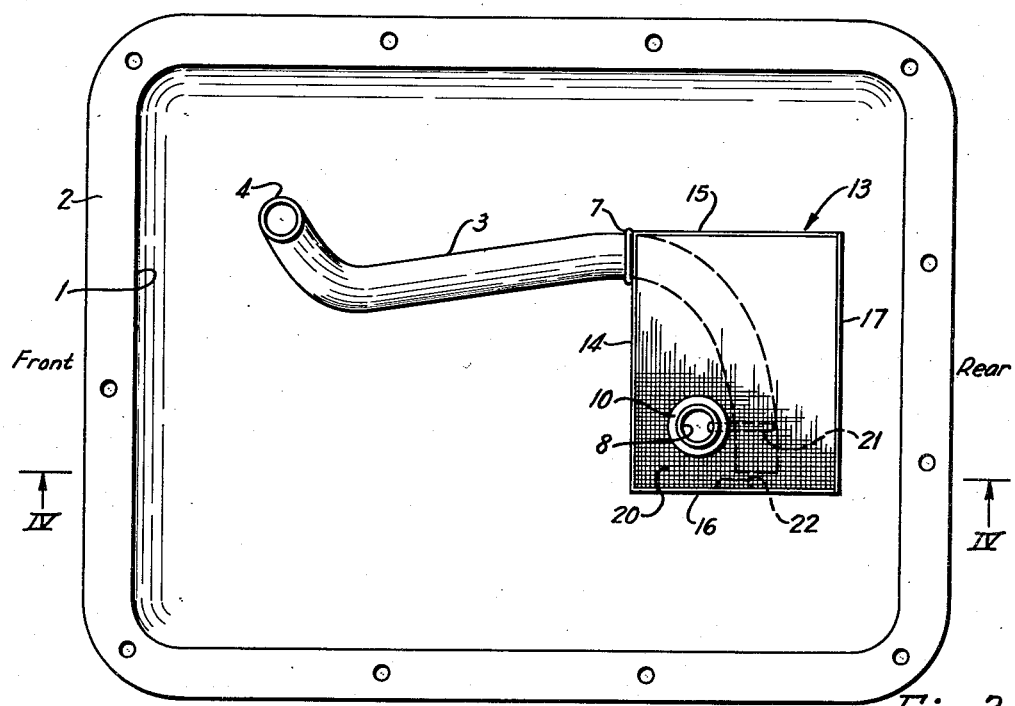

Fig. 3 discloses a plan view of both inlets directed to the rear of the housing with the inlets disposed within an independent box.

Figure 4:
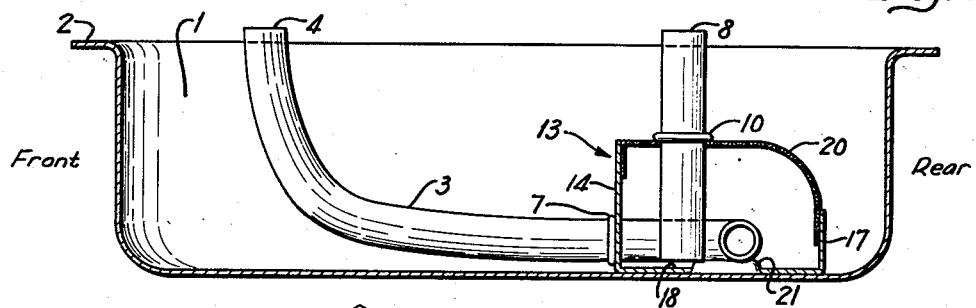

Fig. 4 is a vertical section taken on the line of 4—4 of Fig. 3.

Figure 5:
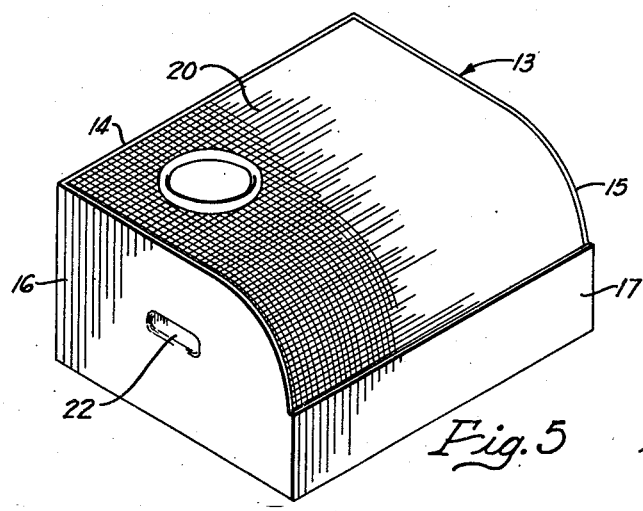

Fig. 5 is a perspective view of the boxes illustrated in Figs. 3 and 4.

Fig. 6 is a view in vertical section illustrating both inlets directed to the rear of the housing with their mouths disposed within an independent box as shown in Figs. 3 to 5.

The automatic transmission to which this improvement is directed is that which is known on the market as the "hydromatic" which employs two pumps for the supply of operating liquid employed in the process of changing gears. This automatic gear-changing device is provided with two independent servo pumps. One is positioned in front of the transmission and supplies the fluid for the changing of the speed through second, third, and fourth gears whereas the rear servomotor functions to supply the speed for the low and reversed gears.

As shown in the drawing, the pan having a uniplanar bottom and positioned under the automatic gear-changing device is indicated at 1 and is provided with an annular lip 2 having suitable openings through which the bolts are passed to bolt the same into position on the underside of the housing of the automatic gear-changing device. The sub part of the mechanism of the automatic gear-changing device extends below the surface of the upper rim of the pan which necessitates the arrangement of the inlet pipe 3 for the front servomotor. This pipe extends upwardly at an angle to be received by the socket in the servo pump housing.

The end of the pipe which is indicated at 4 is connected to the housing by having a snug fit where it telescopes into the housing. The pipe is bent downwardly and in the form of an S to circumvent some of the parts of an automatic speed device and enters an all screen cage such as illustrated in Fig. 1 by the screen 5.

The pipe 3 enters at the opening 6, and the pipe is provided with an annular shoulder 7 to prevent it from being inserted any further into the screen cage. The end of the pipe 3 passes back of the inlet pipe 8 for the rear servo pump, and it rests on the upwardly projecting blister 9 in the bottom of the pan 1 which maintains the pipe 3 in spaced relation from the floor of the pan 1. The blister also extends under the pipe 8 and limits its insertion relative to the floor of the pan 1 as shown in Fig. 2. The inlet pipe 8 is likewise provided with the shoulder 10 for the purpose of limiting its insertion to the screen.

The screen cage 5 merely partitions off and covers the rear portion of the pan, and it may be permanently secured to the inner surface of the pan by soldering or tack welding thereto. The cross-sectional shape of the screen cage 1 as shown in Fig. 1 is similar to the structure as illustrated in Fig. 2 insofar as the shape is concerned, but the front wall of the screen cage 5 is made of mesh material.

Referring now to Fig. 2, pan 1 is provided with a solid baffle partitioning member 11 and extends the full width of the pan which has attached to its upper side the screen member 12 that extends to the sides of the pan from the level of the front edge of the baffle member 11. The baffle member 11 is under the liquid level, and it restricts the movement of liquid into the partitioned section below the top of the baffle. It likewise prevents the liquid from the rear of the partition from being swished away from the inlets of the inlet lines of the servo pumps as illustrated in 3 and 8. A sufficient amount of oil should be carried in the atomatic gear-shifting mechanism to permit the natural level of the oil to flow over the baffle 11. However, the baffle 11 boxes off the rear portion of the pan and retains the sufficient amount of oil in that position at all times to insure that the servo pumps will receive an adequate supply of the actuating fluid and will not be starved by a suction of air due to inertia.

In the structure illustrated in Figs. 3 to 5, the inlet line 3 of the front servo pump of the automatic speed-changing device enters the partition box-like structure 13 that is provided with a front wall 14 and the side walls 15, 16, and the rear wall 17. It will be noted that the front and side walls 14, 15, and 16 are of substantially the same height, being approximately 2 inches, whereas the rear wall 17 is materially shorter. It will also be noted that the box-like structure 13 is not extended to the full width of the pan and is provided with a uniplanar bottom 18 that is integral with the walls and it forms a complete box which has on the upper surface thereof the screen member 20 which permits the oil to flow back into the box structure after being circulated through use. However, the box structure itself restrains the oil within its walls at all times so that it will be ever present to supply the need of the servo pump lines.

As illustrated, the floor 18 of the box 13 is provided with an upwardly projecting blister 21 which supports the end of the inlet pipe 3 for the front servo pump and also determines the limitation of the insertion of the inlet pipe 8 for the rear servo pump. This upwardly projecting blister is similar in all respects to the blister 9 that is formed in the bottom of the pan as illustrated in Figs. 1 and 2.

A second blister 22 is formed in the side wall 16 to prevent the end of the inlet pipe 3 from extending any further or from getting too close to the side wall 16, when assembled in the box as illustrated in Fig. 3.

As shown in Fig. 5, the box may be made as an independent unit and placed on the ends of the supply lines 3 and 8 before the pan is moved into position against the underside of the housing and bolted thereto in a well-know manner. It will be seen that since the box member does not extend for the full width of the pan, the oil may swish back and forth due to inertia and will not have any difficulty in seeking a lower level within the box 13. Although adequate space is always provided by the screen 20 to permit the oil to filter thereto, it will not admit large foreign particles that are ordinarily found in the sludge of a transmission oil owing to the operation of the bands employed to effect a change in speed. The front, side, rear walls and bottom of the box are formed of solid metal, and the rear wall is lower than the other walls. The liquid level normally covers the rear wall 17 of the box, and this liquid is retained by the box in readiness for use for the servo pumps by maintaining the inlets covered at all times. Air is not allowed to be sucked into the inlets of the servo pumps at any time smoothing the operation of the speed-transmission device. This structure will not permit a misoperation of the device owing to starvation of the servo pump by allowing it to suck air. Pan 1 as shown in Figs. 1 to 4 inclusive is deeper than the ordinary pan provided on the automatic transmissions to permit the inlet pipe 3 to pass under the same. However, as shown in Fig. 6, the pan 23 is a pan presently furnished with this type of gear shift mechanism and the inlet pipe 3 is disposed at an angle to extend over a portion of the automatic gear shift mechanism. The end of the pipe as indicated at 4 passes into the pump at an angle relative to the vertical whereas in the earlier structures as shown in Figs. 1 to 4 the inlet was substantially vertical. As shown in Fig. 6, the pipe 3 extends through the top of the mesh beside the inlet pipe 8. All the parts as shown in Fig. 6 are the same as that illustrated in Figs. 1 to 5 with the exception of the pan.

I claim:

1. A liquid pickup for the servo pump of an automatic transmission comprising a walled housing, an enclosure having a solid bottom, front, side and rear walls independent of said housing, said rear wall lower than said front wall, means defining an opening in the top of said enclosure, said enclosure positioned in the bottom rear of said walled housing and a liquid pickup for said servo pump extending into said enclosure to receive and withdraw liquid therefrom.

2. A liquid pickup for the servo pump of an automatic transmission comprising a housing enclosing the transmission and having a uniplanar bottom forming a reservoir to hold the operating liquid, an enclosure partitioning off the bottom rear of said housing having a solid front, side and rear walls, said walls forming a box and said rear wall being lower than said front wall, a screen closing over the top of said box, and servo pump pickup means extending into said enclosure to receive and withdraw liquid therefrom.

References Cited in the file of this patent

UNITED STATES PATENTS

| | | |
|---|---|---|
| 1,281,548 | Frederick | Oct. 15, 1918 |
| 1,667,728 | Fisher | May 1, 1928 |
| 1,671,391 | Winslow et al. | May 29, 1928 |
| 1,848,986 | Anibal | Mar. 8, 1932 |
| 2,440,815 | Wharam | May 4, 1948 |
| 2,480,486 | Leazer | Aug. 3, 1949 |
| 2,577,188 | Hall | Dec. 4, 1951 |

FOREIGN PATENTS

| | | |
|---|---|---|
| 860,044 | France | Sept. 20, 1940 |